US012525317B2

(12) United States Patent
Choi et al.

(10) Patent No.: US 12,525,317 B2
(45) Date of Patent: Jan. 13, 2026

(54) APPARATUS AND METHOD FOR PREDICTING CELL TYPE ENRICHMENT FROM TISSUE IMAGES USING SPATIALLY RESOLVED GENE EXPRESSION DATA

(71) Applicant: PORTRAI INC., Seoul (KR)

(72) Inventors: Hongyoon Choi, Seoul (KR); Young Tae Kim, Seoul (KR); Kwon Joong Na, Seoul (KR)

(73) Assignee: PORTRAI INC., Seoul (KR)

( * ) Notice: Subject to any disclaimer, the term of this patent is extended or adjusted under 35 U.S.C. 154(b) by 304 days.

(21) Appl. No.: 18/555,419

(22) PCT Filed: Feb. 14, 2022

(86) PCT No.: PCT/KR2022/002158
§ 371 (c)(1),
(2) Date: Oct. 13, 2023

(87) PCT Pub. No.: WO2022/220385
PCT Pub. Date: Oct. 20, 2022

(65) Prior Publication Data
US 2024/0194292 A1    Jun. 13, 2024

(30) Foreign Application Priority Data

Apr. 15, 2021  (KR) .................. 10-2021-0049331
Aug. 20, 2021  (KR) .................. 10-2021-0110364

(51) Int. Cl.
*G06V 20/69* (2022.01)
*G06T 7/00* (2017.01)
(Continued)

(52) U.S. Cl.
CPC ............ *G16B 20/00* (2019.02); *G06T 7/0012* (2013.01); *G06V 10/774* (2022.01);
(Continued)

(58) Field of Classification Search
CPC ....... G16B 25/10; G16B 40/20; G06V 10/774; G06T 7/0012
See application file for complete search history.

(56) References Cited

U.S. PATENT DOCUMENTS 10,354,747 B1 *  7/2019  DePristo .................. G06N 3/04
10,467,754 B1 * 11/2019  Ando ..................... G06T 7/0014
(Continued)

FOREIGN PATENT DOCUMENTS

CN       112185465 A      1/2021
JP       2021-032705 A    3/2021
(Continued)

OTHER PUBLICATIONS

Alona Levy-Jurgenson et al., "Spatial transcriptomics inferred from pathology whole-slide images links tumor heterogeneity to survival in breast and lung cancer," Scientific Reports, 2020.
(Continued)

*Primary Examiner* — Edward Park
(74) *Attorney, Agent, or Firm* — Dickinson Wright PLLC

(57) ABSTRACT

An apparatus for predicting cell type enrichment from tissue images based on spatially resolved gene expression information comprises: a communication module receiving tissue images of a test object; a memory storing a program for predicting cell type enrichment information from the tissue images; and a processor executing the program. The program predicts the cell type enrichment information by inputting the tissue images to a cell type enrichment prediction model which is trained using training data that consists of spatially resolved transcriptome information and tissue images spatially aligned with the spatially resolved transcriptome information. The spatially resolved transcriptome information includes: transcriptome data including spatial information; and tissue image data sharing the spatial information. The spatial information refers to position infor-
(Continued)

mation about multiple spots arranged in a two-dimensional plane in the tissue image data, and includes the coordinates of each of the spots.

18 Claims, 9 Drawing Sheets

(51) Int. Cl.
*G06V 10/774* (2022.01)
*G16B 20/00* (2019.01)
*G16B 25/10* (2019.01)
*G16B 40/20* (2019.01)

(52) U.S. Cl.
CPC .......... *G06V 20/695* (2022.01); *G06V 20/698* (2022.01); *G16B 25/10* (2019.02); *G16B 40/20* (2019.02); *G06T 2207/20081* (2013.01); *G06T 2207/30024* (2013.01)

(56) References Cited

U.S. PATENT DOCUMENTS

| | | | |
|---|---|---|---|
| 2005/0165290 A1 | 7/2005 | Kotsianti et al. | |
| 2018/0353072 A1* | 12/2018 | Gelbman | G06V 40/172 |
| 2022/0367053 A1* | 11/2022 | Mahmood | G16B 40/20 |
| 2024/0194292 A1* | 6/2024 | Choi | G06V 20/695 |

FOREIGN PATENT DOCUMENTS

| | | | |
|---|---|---|---|
| KR | 10-2020-0058662 A | 5/2020 | |
| KR | 10-2108050 B1 | 5/2020 | |
| WO | 2021/067514 A1 | 4/2021 | |

OTHER PUBLICATIONS

The Australian Examination Report for Australian Patent Application No. 2022257481, dated Oct. 17, 2024.
Sungwoo Bae, et al., "Discovery of molecular features underlying morphological landscape by integrating spatial transcriptomic data with deep features of tissue image," bioRxiv, 2020, 150698.
Tommaso Biancalani et al., "Deep learning and alignment of spatially-resolved whole transcriptomes of single cells in the mouse brain with Tangram," bioRxiv, 2020, 272831.
Bryan He et al., "Integrating spatial gene expression and breast tumour morphology via deep learning," Nature biomedical engineering, 2020, pp. 827-834, 4(8).
Floyd Maseda et al., "DEEPsc: a deep learning-based map connecting single-cell transcriptomics and spatial imaging data," Frontiers in Genetics, 2021, vol. 12, 636743.
Xiao Tan, et al., "SpaCell: integrating tissue morphology and spatial gene expression to predict disease cells," Bioinformatics, 2019, pp. 2293-2294, 36(7).
Ruben Dries et al., "Giotto, a toolbox for integrative analysis and visualization of spatial expression data," Genome Biology, 2021, 22:78.
The Extended European Search Report for European Patent Application No. 22788243.8, dated Feb. 12, 2025.
Benoît Schmauch et al., "A deep learning model to predict RNA-Seq expression of tumours from whole slide images," Nature Communications, Aug. 3, 2020, vol. 11.
Qianqian Song et al., "DSTG: deconvoluting spatial transcriptomics data through graph-based artificial intelligence", Briefings in Bioinformatics, Jan. 22, 2021, vol. 22, Issue. 5, pp. 1-13.
Niyaz Yoosuf et al., "Identification and transfer of spatial transcriptomics signatures for cancer diagnosis", Breast Cancer Research, 2020, vol. 22:6, pp. 1-10.
Sungwoo Bae et al., "CellDART: Cell type inference by domain adaptation of single-cell and spatial transcriptomic data", bioRxiv, Apr. 27, 2021.
Eduard Chelebian et al., "Morphological Features Extracted by AI Associated with Spatial Transcriptomics in Prostate Cancer", Cancers, Sep. 28, 2021, vol. 13:4837, pp. 1-14.
Sungwoo Bae et al., Discovery of molecular features underlying the morphological landscape by integrating spatial transcriptomic data with deep features of tissue images, Nucleic Acids Research, Feb. 22, 2021, vol. 49, No. 10, pp. 1-12.

\* cited by examiner

【FIG. 1】
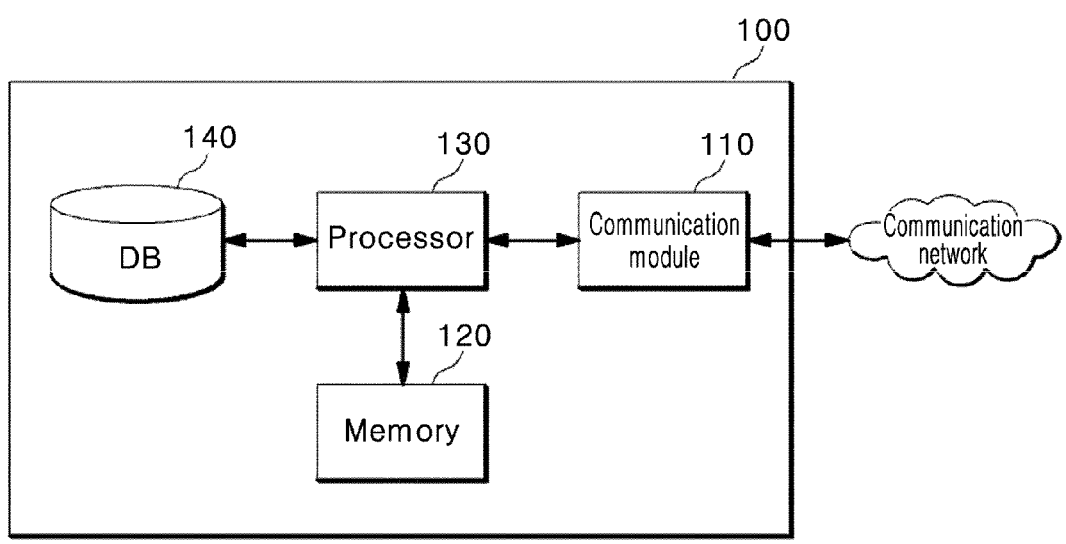

[FIG. 2]
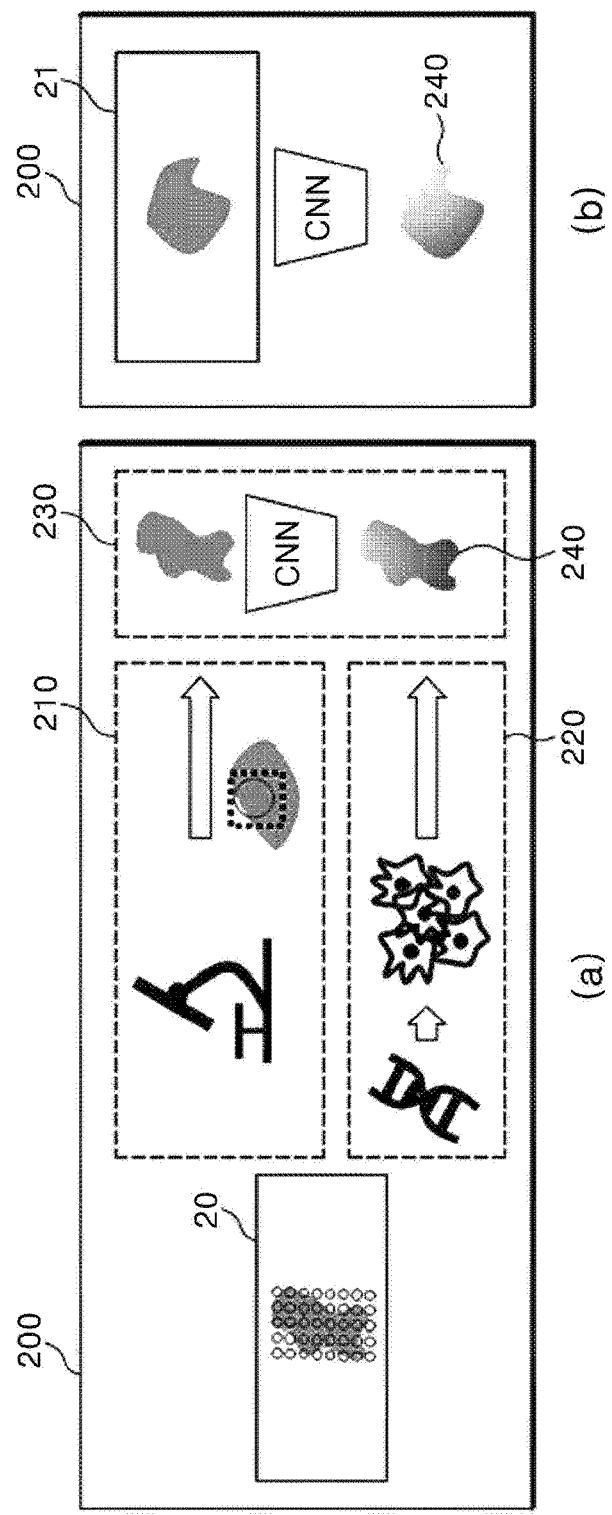

[FIG. 3]
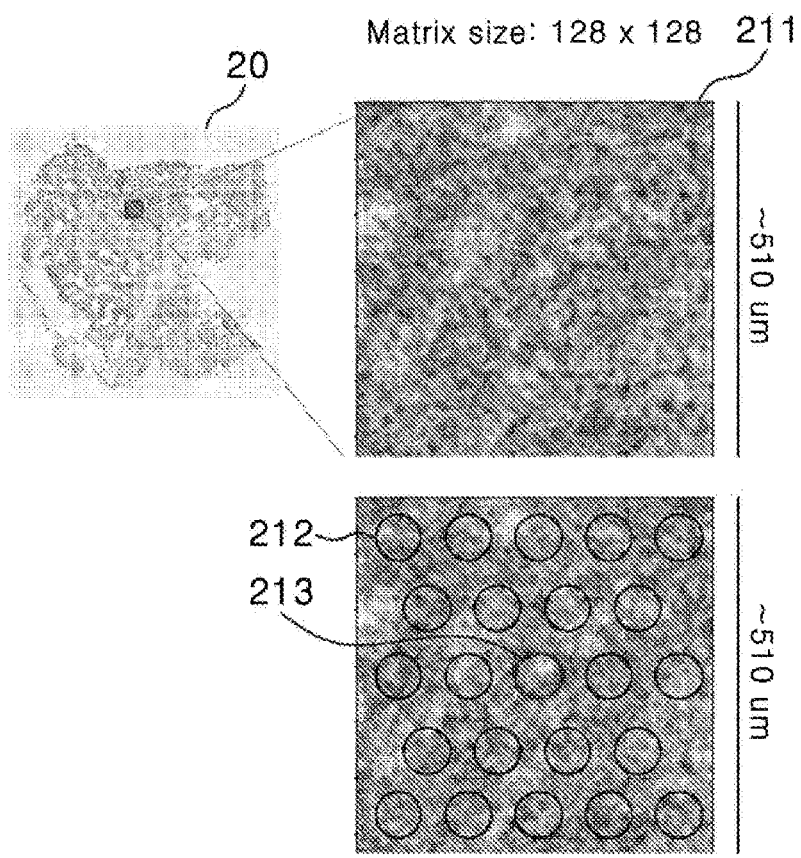

[FIG. 4]
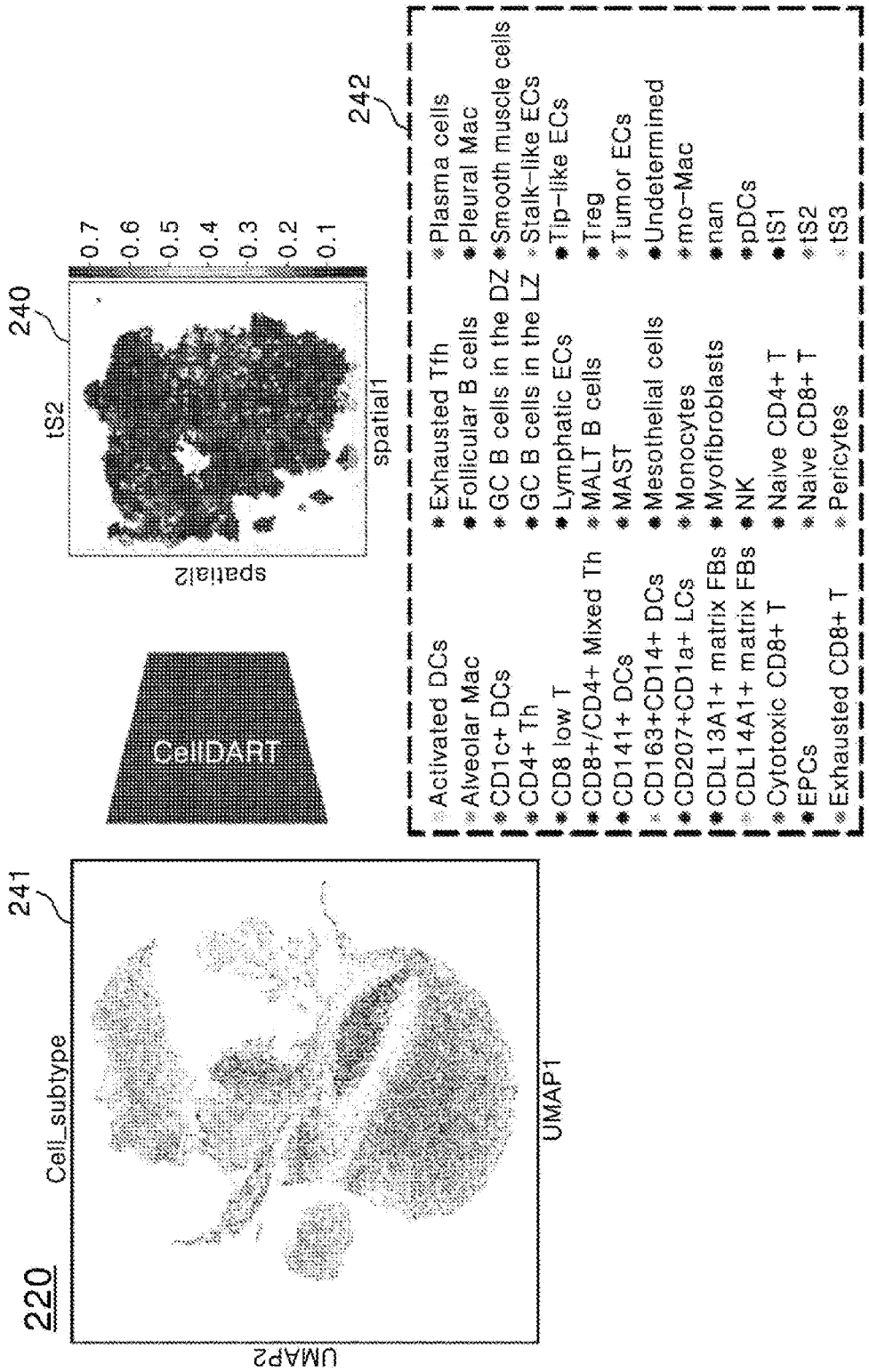

[FIG. 5]
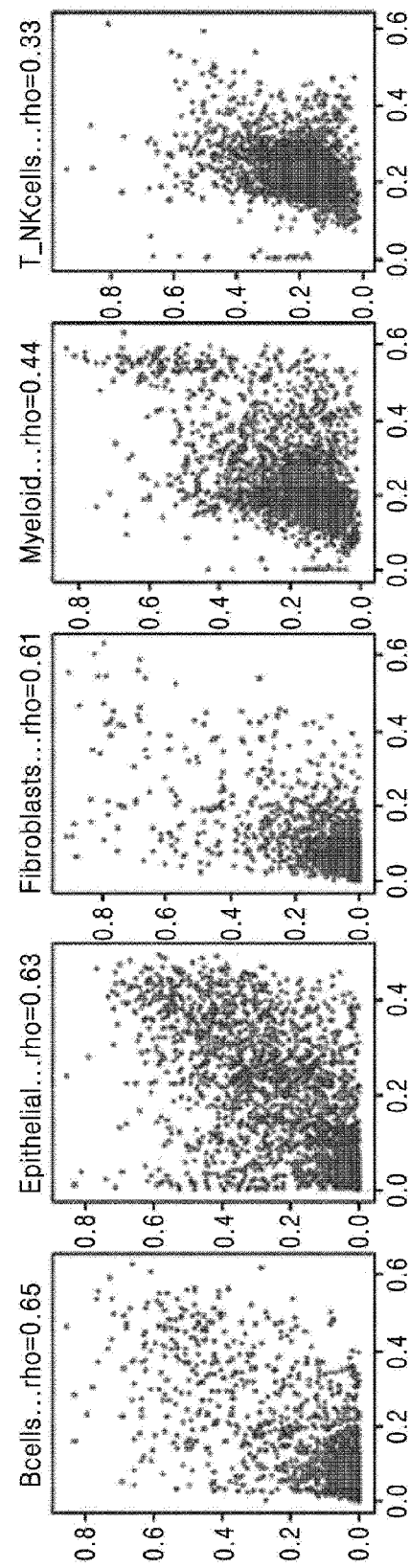

[FIG. 6]
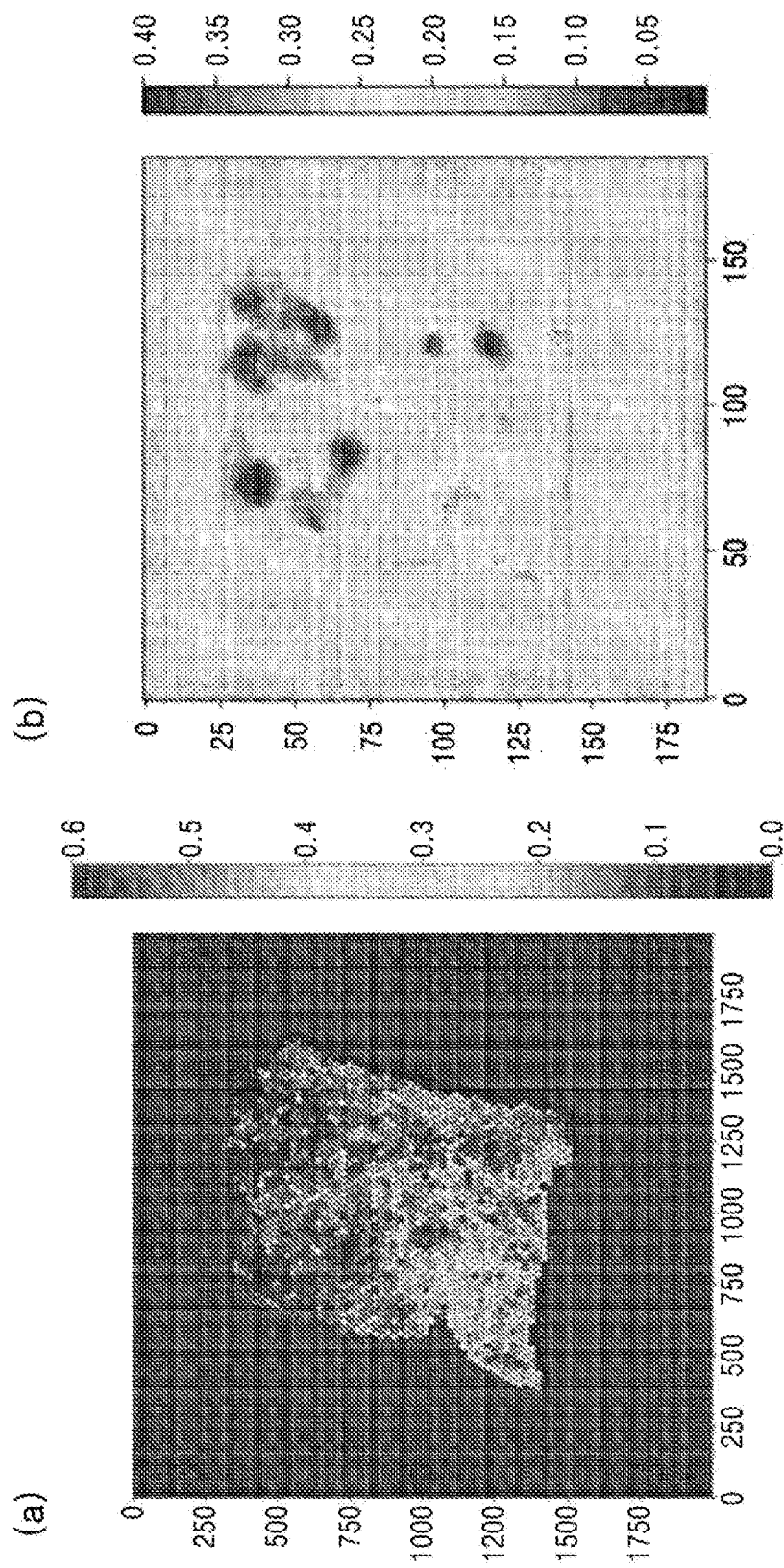

[FIG. 7]
(a) 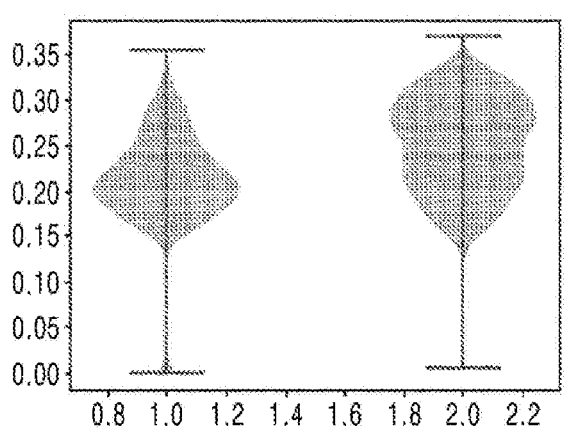
(b) 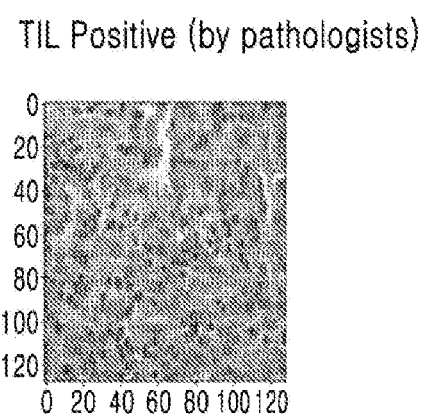

[FIG. 8]
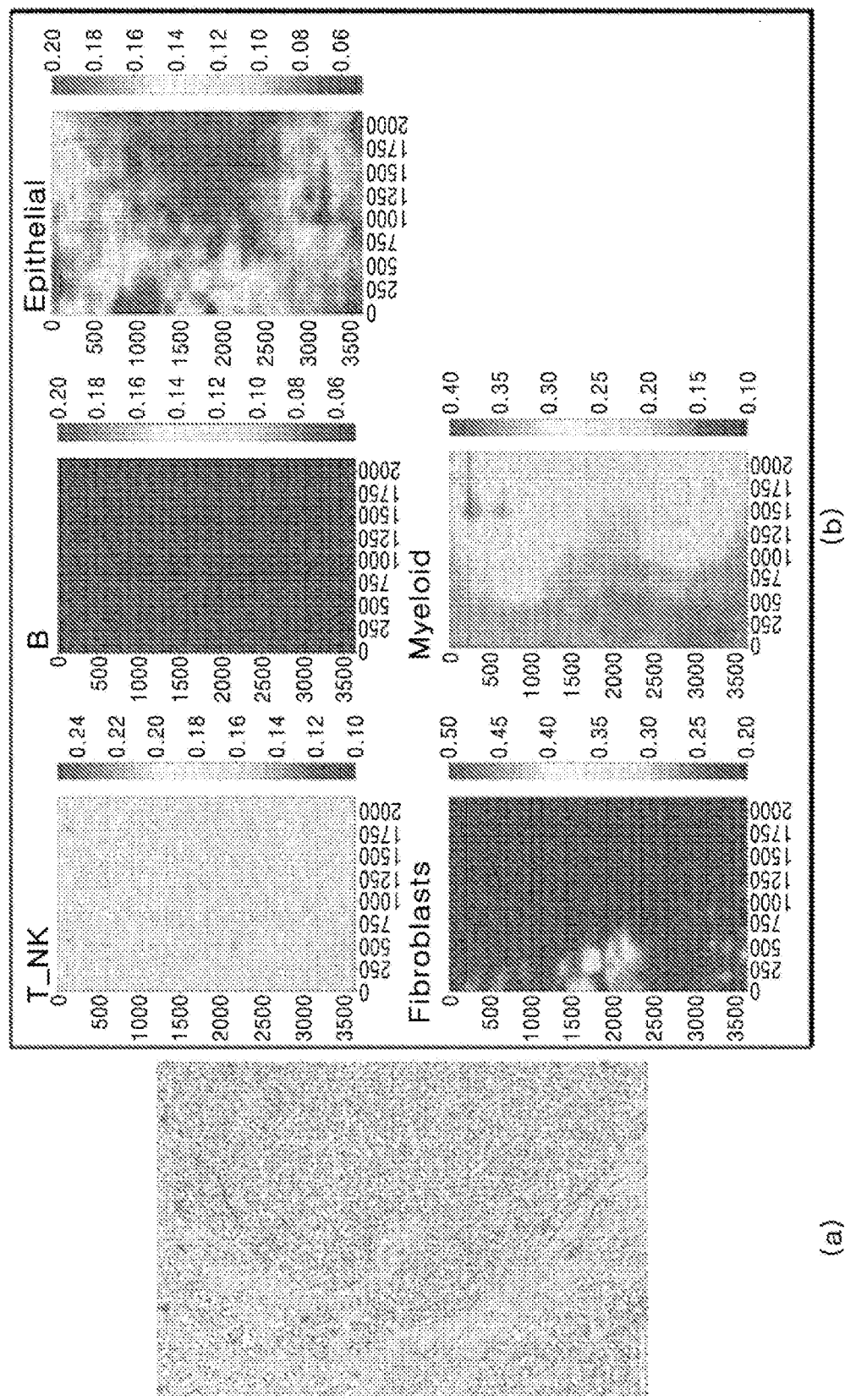

[FIG. 9]
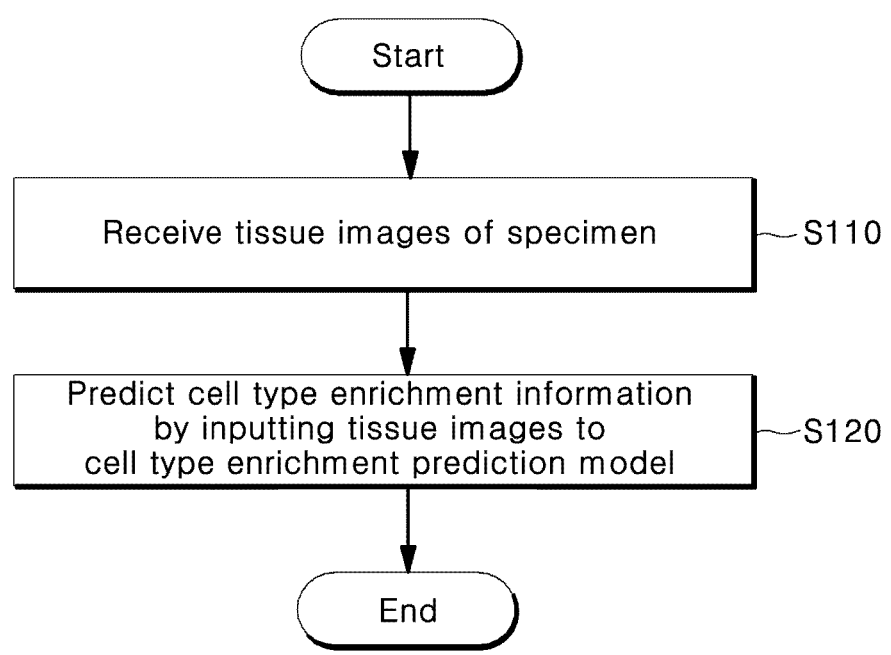

APPARATUS AND METHOD FOR PREDICTING CELL TYPE ENRICHMENT FROM TISSUE IMAGES USING SPATIALLY RESOLVED GENE EXPRESSION DATA

TECHNICAL FIELD

The present invention relates to an apparatus and method for predicting cell type enrichment from tissue images based on spatially resolved gene expression information.

BACKGROUND ART

Microscope tissue images contain information of various cells, which are organized into complex structures according to functions thereof. To identify functionally classified cell types and obtain biomarkers from the complex structures, molecularly specific staining methods (immunohistochemical staining or fluorescence in-situ hybridization) other than simple tissue images are widely used.

For such molecular-level pathology images, molecular information can be acquired at a single level or at several levels per experiment and additional experimental procedures and materials are required for tissues.

Spatially resolved transcriptome technology developed and utilized in recent years can simultaneously acquire gene expression information from hundreds to tens of thousands of genes while preserving tissue position information.

A labeling task of distinguishing morphological tissue configuration from simple tissue images (hematoxylin and eosin staining) is performed by experts in pathology. Recently, deep learning techniques have been developed based on this task to predict labeling of pathological tissue images from tissue images.

In this regard, Korean Patent Registration No. 10-2108050 (entitled "Method and apparatus for classifying breast cancer histology images through augmented convolutional network") discloses a method for classifying breast cancer histology images through an augmented convolutional network.

DISCLOSURE

Technical Problem

The present invention has been developed to solve these problems and it is an aspect of the present invention to provide an apparatus and method for predicting complex cell type enrichment information in tissues by inputting general tissue images free from spatially resolved transcriptome information to a cell type enrichment prediction model trained based on spatially resolved transcriptome information which includes a spatial data-sharing transcriptome and tissue images.

It should be understood that the above and other objects will become apparent from the detailed description of the invention.

Technical Solution

In accordance with one aspect of the present invention, an apparatus for predicting cell type enrichment from tissue images based on spatially resolved gene expression information includes: a communication module receiving tissue images of a specimen; a memory storing a program for predicting cell type enrichment information from the tissue images; and a processor executing the program, wherein the program predicts the cell type enrichment information by inputting the tissue images to a cell type enrichment prediction model which is trained using training data that consists of spatially resolved transcriptome information and tissue images spatially aligned with the spatially resolved transcriptome information, and the spatially resolved transcriptome information includes transcriptome data including spatial information and tissue image data sharing the spatial information, the spatial information meaning position information about multiple spots arranged in a two-dimensional plane in the tissue image data and including coordinates of each of the spots.

In accordance with another aspect of the present invention, a method for predicting cell type enrichment from tissue images based on spatially resolved gene expression information using the apparatus for predicting cell type enrichment from tissue images includes: receiving tissue images of a specimen; and predicting cell type enrichment information by inputting the tissue images to a cell type enrichment prediction model which is trained using training data that consists of spatially resolved transcriptome information and tissue images spatially aligned with the spatially resolved transcriptome information, wherein the spatially resolved transcriptome information includes transcriptome data including spatial information and tissue image data sharing the spatial information, and the spatial information means position information about multiple spots arranged in a two-dimensional plane in the tissue image data and includes coordinates of each of the spots.

Advantageous Effects

Embodiments of the present invention provide a training model that can predict cell type enrichment information of various cells based only on morphological information of easily obtained tissue images (H&E staining).

Embodiments of the present invention provide a training model that can predict cell type enrichment information of cells according to the types of cells or diseases using, as training data, tissue images obtained from various diseases and spatially resolved transcriptome information which includes transcriptome data sharing spatial information with the tissue images.

On the other hand, although deep learning-based algorithms have been reported to estimate tissue sub-classifications from H&E staining, these algorithms have a disadvantage of requiring visual reading and labeling by a tissue imaging expert. In addition, such labeling requires time-consuming and laborious operation and provides differences between evaluation operators. Moreover, since the deep learning-based algorithms do not provide molecular-level information, it is difficult to develop algorithms to estimate distributions under detailed molecular-functional cellular classifications.

However, the present invention solves the aforementioned problems. First, the present invention may be utilized as a numerical method to quantify diversity of cell groups in various diseases. That is, quantitative information on the diversity of cell groups can be obtained by inputting only simple tissue images to the training model. This can be used in study of pathophysiology of various diseases (cancer, inflammatory diseases, and the like), development of new treatment technology, development of diagnostic biomarkers, and the like.

Secondly, the present invention can quantify molecular-functional cells by inputting simple tissue images to the training model. This can be used as a biomarker to identify characteristics and severity of a certain disease or to predict effects of treatment.

For example, it is well known that concentration of inflammatory cells other than cancer cells in tumors is closely related to prediction of response to tumor immunotherapy. In other words, simple tissue images input to the training model according to the present invention can predict distribution information of the inflammatory cells and can be used as quantitative biomarkers.

DESCRIPTION OF DRAWINGS

FIG. 1 is a block diagram of an apparatus for predicting cell type enrichment from tissue images according to an exemplary embodiment of the present invention.

FIG. 2 is a conceptual view of a cell type enrichment prediction model according to an exemplary embodiment of the present invention.

FIG. 3 is a view of an image dividing part of the cell type enrichment prediction model according to the exemplary embodiment of the present invention.

FIG. 4 is a view of a molecule marker model part of the cell type enrichment prediction model according to the exemplary embodiment of the present invention.

FIG. 5, FIG. 6, FIG. 7, and FIG. 8 are views of cell type enrichment information predicted from tissue images input to the cell type enrichment prediction model according to the exemplary embodiment of the present invention.

FIG. 9 is a flowchart illustrating a method for predicting cell type enrichment from tissue images according to an exemplary embodiment of the present invention.

BEST MODE

Hereinafter, exemplary embodiments of the present invention will be described with reference to the accompanying drawings. However, it should be understood that the present invention may be realized in various ways and is not limited to the following embodiments. In addition, the accompanying drawings are provided only to facilitate understanding of the embodiments disclosed herein and the technical ideas disclosed herein are not limited by the accompanying drawings. In the drawings, portions not relating to the description of the invention are omitted for clarity, and the sizes, forms and shapes of components shown in the drawings may be modified in various ways. The same/like components will be denoted by the same/like reference numerals throughout the specification.

Herein, the suffixes "module," "part" and the like for components in the following description are assigned or interchanged solely for ease of description and are not intended to have distinct meanings or roles. Further, in description of the embodiments disclosed herein, detailed descriptions of related art will be omitted when it is determined that such detailed descriptions could obscure the essence of the embodiments disclosed herein.

Herein, when an element is referred to as being "connected (joined, contact, or coupled)" to another element, it may be directly connected (joined, contact, or coupled) to the other element, or may be indirectly connected (joined, contact, or coupled) to the other element with intervening elements therebetween. In addition, unless specifically stated otherwise, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Although the terms "first," "second," and the like may be used herein to describe various types of elements, these terms are used to distinguish one element from another element and these elements should not be limited by these terms. For example, a first element of the present invention may be named a second element, and similarly, a second element may be named a first element.

FIG. 1 is a block diagram of an apparatus for predicting cell type enrichment from tissue images according to an exemplary embodiment of the present invention.

Referring to FIG. 1, an apparatus 100 for predicting cell type enrichment from tissue images includes a communication module 110, a memory 120 and a processor 130, and may further include a database 140. The cell type enrichment prediction apparatus 100 receives tissue images of a specimen and performs operation of predicting cell type enrichment information based on the tissue images.

To this end, the cell type enrichment prediction apparatus 100 may be implemented by a computer or a portable terminal that can be connected to a server or other terminals through a network. Here, the computer may include, for example, a laptop, a desktop, and the like provided with a web browser, and the portable terminal may include, for example, any kind of handheld-based wireless communication device, such as a smartphone, a tablet PC, a smart watch, and the like, which is portable and mobile.

The network refers to a connection structure that allows information exchange between individual nodes, such as terminals and devices, and includes local area networks (LAN), wide area networks (WAN), the world wide web (WWW), wired/wireless data communication networks, telephone networks, wired/wireless television networks, and the like. Examples of the wireless data communication networks include 3G, 4G, 5G, 3rd Generation Partnership Project (3GPP), Long Term Evolution (LTE), World Interoperability for Microwave Access (WiMAX), Wi-Fi, Bluetooth, infrared communication, ultrasonic communication, visible light communication (VLC), LiFi, and the like, without being limited thereto.

The communication module 110 receives a tissue image of a specimen. Here, the tissue image refers to a tissue image that can be easily achieved through a microscope and does not include spatially resolved transcriptome information. The communication module 110 may include a device that includes hardware and software for transmission and reception of signals, such as control signals or data signals, through a wired or wireless connection with other network devices.

The memory 120 stores a program for predicting cell type enrichment information from tissue images received through the communication module 110. Here, the program for predicting cell type enrichment information predicts the cell type enrichment information by inputting the tissue images to a cell type enrichment prediction model which is trained using training data that consists of spatially resolved transcriptome information and tissue images spatially aligned with the spatially resolved transcriptome information. Details of the cell type enrichment information will be described below.

Here, the memory 120 should be interpreted to refer to non-volatile storage devices that retain stored information even when not powered, and volatile storage devices that require power to retain stored information. The memory 120 may function to temporarily or permanently store data processed by the processor 130. The memory 130 may include magnetic storage media or flash storage media in addition to volatile storage devices that require power to maintain the stored information, without being limited thereto.

The processor 130 executes the program for predicting cell type enrichment information stored in the memory 120 and outputs the cell type enrichment information about the examination subject as a result of execution.

By way of example, the processor 130 may be implemented in the form of a microprocessor, a central processing unit (CPU), a processor core, a multiprocessor, an application-specific integrated circuit (ASIC), a field programmable gate array (FPGA), and the like, without being limited thereto.

The database 140 may store tissue images received through the communication module 110, or various data for training the cell type enrichment prediction model. In addition, the database 140 may cumulatively store the cell type enrichment information extracted by a cell type enrichment information extraction program, which may be utilized in various applications for quantifying molecular-functional cells by the tissue images based on the cell type enrichment information.

Next, the cell type enrichment prediction model for extraction of the cell type enrichment information will be described.

FIG. 2 is a conceptual view of a cell type enrichment prediction model according to an exemplary embodiment of the present invention. FIG. 3 is a view of an image dividing part of the cell type enrichment prediction model according to the exemplary embodiment of the present invention.

Spatially resolved transcriptome information 20 includes transcriptome data including spatial information and tissue image data sharing the spatial information. The spatial information means position information about multiple spots 212 arranged in a two-dimensional plane in the tissue image data and includes coordinates of each of the spots 212. Here, the tissue image data include tissue images taken after H&E staining using a special slide containing the coordinates of the multiple spots and are well known in the art. Thus, detailed description of the tissue image data will be omitted herein.

That is, the spatially resolved transcriptome information 20 is data obtained from hundreds to tens of thousands of transcriptome data for each spot 212, in which the transcriptome data and the tissue image data are spatially matched to each other based on the coordinates of the spots 212.

The cell type enrichment prediction model 200 is constructed based on training data in which the spatially resolved transcriptome information 20 for each of previously collected human or animal tissues is matched to cell type enrichment information 240 with respect to the transcriptome data classified according to the coordinates of each of the spots 212.

The cell type enrichment prediction model 200 includes an image dividing part 210, a molecule marker model part 220, and a prediction part 230.

The image dividing part 210 divides the tissue image data into patch tissue images of a preset size.

The image dividing part 210 is constructed to perform a process of matching the transcriptome data with the tissue image data based on the coordinates of the spots 212, a process of placing a rectangular box of a preset size in the tissue image data including the multiple spots 212, and a process of extracting the tissue image data into at least one patch tissue image 211 such that the coordinates of a central spot 212 among the multiple spots 212 become central coordinates 213 of the rectangular box.

For example, the patch tissue image 211 may have an image size of 128×128 and one side of the patch may have a length of 510 µm.

By way of example, the image dividing part 210 may match the transcriptome data with the tissue image data based on the coordinates of each of the spots (spatial unit for acquisition of the transcriptome data). Next, based on the coordinates 213 of the central spot 212, the tissue image data may be divided into multiple patch images (patch tissue images) having a preset rectangular (rectangular box) size. Then, the molecule marker model part 220 may output cell distribution information (cell density) for each type of cell group based on the transcriptome data present in the divided patch tissue images 211.

The molecule marker model part 220 outputs the cell distribution information for each type of cell group labeled through the transcriptome data. By way of example, the molecule marker model part 220 may be implemented by a CellDART model or may be implemented by a deep learning-based algorithm that estimates cell classifications of tissues with existing tissue images (H&E staining), without being limited thereto.

FIG. 4 is a view of the molecule marker model part of the cell type enrichment prediction model according to the exemplary embodiment of the present invention.

Referring to FIG. 4, the molecule marker model part 220 may be constructed based on training data in which cell distribution information 241 for each type of cell group present in existing tissue images previously published is matched to transcriptome data present in each single-cell type 242. The molecule marker model component 220 can generate cell type enrichment information 240 utilizing the CellDART model. This model is constructed based on training data that includes the cell distribution information 241 labeled with the transcriptome data and information about each single-cell type 242 obtained from existing studies. By way of example, the CellDART model includes a feature extractor that includes a source classifier and a domain classifier. The CellDART model preprocesses an existing transcriptome data set and extracts integrated marker genes with respect to each cell cluster. Next, the transcriptome data shared by a pooled cluster marker and the spatially resolved transcriptome information is selected for downstream analysis. Next, 8 cells are randomly selected from single-cell data and randomly weighted to generate 20,000 similarities.

The feature extractor is trained to estimate cell fractions from the similarities and to distinguish the similarities from spatial spots. First, the weights of neural networks except for the domain classifier are updated, data labels for spots and similar spots are inverted, and the domain classifier is updated alone. Finally, the trained CellDART model is applied to the spatial transcriptome data to estimate the proportion of cells in each spot. In the CellDART model, single-cell transcriptome data to estimate cells may be labeled with cell-specific names by existing studies using publicly available data. Since this technique is known in the art, detailed description of this technique will be omitted.

Referring again to FIG. 2, the prediction part 230 extracts the cell type enrichment information 240 labeled with the transcriptome data based on the coordinates 213 of a central spot 212 among the multiple spots 212 present in the patch tissue images 211.

By way of example, the prediction part 230 may preprocess the patch tissue image 211. Preprocessing may include stain normalization for H&E staining. For example, the patch tissue image 211 may be augmented through rotation, operation for bilateral/vertical symmetry, zooming-in and zooming-out (in 20% steps), and variation for each RGB channel as random functions with respect to data input to a training process of a convolutional neural network.

By way of example, the convolutional neural network is based on ResNet-50, which is based on ImageNet, and may employ parameters trained in ImageNet first while updating the parameters during the training process. In addition, 5% of the total patch tissue images 211 may be utilized for internal validation. For a full training process, 64 patch tissue images and cell groups may be input per mini-batch, and for an optimization process, an Adam optimizer may be applied. The learning rate may be set to 0.0001 and the total number of epochs may be set to 100. In addition, Poisson Loss is used as the loss function for model training in consideration of distribution of cell density.

FIG. 5 to FIG. 8 are views of cell type enrichment information predicted from tissue images input to the cell type enrichment prediction model according to the exemplary embodiment of the present invention.

The program includes information about the types of cell groups predicted from the tissue images 21 and a heatmap tissue image indicating distribution of cells in each type of cell group, as the cell type enrichment information 240.

FIG. 5 shows cell type enrichment information for each type of cell group predicted by inputting H&E images of tissues to the cell type enrichment prediction model 200 according to the present invention.

As shown in the drawings, an estimation image of cell densities may be generated by inputting patches of independent tissue image data to the cell type enrichment prediction model 200.

This estimation image shows the density of cell groups predicted from the transcriptome in a 5% randomly selected internal validation set and results of a model predicted from tissue images patches of H&E images. The horizontal axis indicates values predicted by the deep training model and the tissue image patches of H&E images, and the vertical axis indicates the density of cells obtained from the transcriptome data.

FIG. 6(a) shows information about the types of cell groups predicted from the tissue images 21 and FIG. 6(b) shows a heatmap tissue image indicating cell distribution information for each type of cell group. By inputting tissue images obtained from Visium to the cell type enrichment prediction model 200 according to the invention, a heatmap tissue image that estimates cell distribution information of the myeloid type when applied based on the patch tissue images can be output.

Referring to FIG. 7, based on an externally available dataset of tissue image patches of lung adenocarcinoma indicating whether Tumor Infiltrating Lymphocytes (TILs) are present in the tissue image patches based on pathologist opinion to evaluate whether the model works independently, it was confirmed that patches with TILs provided statistically significantly higher T/NK cell values.

FIG. 8(a) shows publicly available H&E images of lung adenocarcinoma as independent data, and, when an image of lung adenocarcinoma publicly known in the art is input to the cell type enrichment prediction model 200 according to the present invention, cell distribution information for each type of cell group in the tissues can be predicted, as shown in FIG. 8(b).

In the following description, detailed description of the same components as those shown in FIG. 1 to FIG. 8 will be omitted.

FIG. 9 is a flowchart illustrating a method for predicting cell type enrichment from tissue images according to an exemplary embodiment of the present invention.

A method for predicting cell type enrichment from tissue images based on spatially resolved gene expression information using the cell type enrichment prediction apparatus 100 according to an exemplary embodiment of the present invention includes: receiving tissue images 21 of a specimen (S110); and predicting cell type enrichment information by inputting the tissue images 21 to a cell type enrichment prediction model 200 which is trained using training data that consists of spatially resolved transcriptome information 20 and molecule markers. The spatially resolved transcriptome information 20 includes transcriptome data including spatial information and tissue image data sharing the spatial information. The spatial information means position information about multiple spots 212 arranged in a two-dimensional plane in the tissue image data and includes coordinates of each of the spots 212.

The cell type enrichment prediction model 200 is constructed based on training data in which the spatially resolved transcriptome information 20 for each of previously collected human or animal tissues is matched to cell type enrichment information 240 with respect to transcriptome data classified according to the coordinates of each of the spots 212.

The cell type enrichment prediction model 200 includes: an image dividing part 210 that divides the tissue image data into patch tissue images of a preset size; a molecule marker model part 220 that outputs the cell distribution information for each type of cell group labeled through the transcriptome data, and a prediction part 230 that extracts the cell type enrichment information 240 labeled with the transcriptome data based on the coordinates 213 of a central spot 212 among the multiple spots 212 present in the patch tissue images 211.

The image dividing part 210 of the cell type enrichment prediction model 200 is constructed to perform a process of matching the transcriptome data with the tissue image data based on the coordinates of the spots 212, a process of placing a rectangular box of a preset size in the tissue image data including the multiple spots 212, and a process of extracting the tissue image data into at least one patch tissue image 211 such that the coordinates of a central spot 212 among the multiple spots 212 become central coordinates 213 of the rectangular box.

In the step of predicting cell type enrichment information (S120), the cell type enrichment information 240 includes information about the types of cell groups predicted from the tissue images 21 as the cell type enrichment information 240 and a heatmap tissue image indicating distribution of cells in each type of cell group.

The cell type enrichment prediction method described above may also be implemented in the form of recording media comprising computer-readable instructions, such as program modules executable by a computer. The computer-readable media may be any available media that can be accessed by a computer, and includes any type of media including volatile, non-volatile, removable and non-removable media. In addition, the computer-readable media may include computer storage media. The computer storage media includes any type of media including volatile, non-volatile, removable and non-removable media implemented in any method or technology for storing information, such as computer-readable instructions, data structures, program modules, or other data.

It will be understood by a person having ordinary knowledge in the art that the invention can be easily modified into other specific forms based on the above description without changing the technical idea or essential features of the invention. Therefore, it should be understood that the above embodiments are provided for illustration only and are not to be construed in any way as limiting the present invention. The scope of the invention should be defined by the appended claims and should be interpreted as including the meaning and scope of the claims and all modifications or variations derived from equivalents thereto.

The invention claimed is:

1. An apparatus for predicting cell type enrichment from tissue images based on spatially resolved gene expression information, comprising:
a communication module receiving tissue images of a specimen;
a memory storing a program for predicting cell type enrichment information from the tissue images; and
a processor executing the program,
wherein the program predicts the cell type enrichment information by inputting the tissue images to a cell type enrichment prediction model which is trained using training data that consists of spatially resolved transcriptome information and tissue images spatially aligned with the spatially resolved transcriptome information,
wherein the spatially resolved transcriptome information includes transcriptome data having spatial information and tissue image data sharing the spatial information,
wherein the spatial information means position information about multiple spots arranged in a two-dimensional plane in the tissue image data and includes coordinates of each of the spots.

2. The apparatus for predicting cell type enrichment from tissue images according to claim 1, wherein the cell type enrichment prediction model is constructed based on training data in which the spatially resolved transcriptome information for each of previously collected human or animal tissues is matched to the cell type enrichment information with respect to the transcriptome data classified according to the coordinates of each of the spots.

3. The apparatus for predicting cell type enrichment from tissue images according to claim 2, wherein the cell type enrichment prediction model includes: an image dividing part dividing the tissue image data into patch tissue images of a preset size; a molecule marker model part outputting the cell distribution information for each type of cell group labeled through the transcriptome data, and a prediction part extracting the cell type enrichment information labeled with the transcriptome data based on the coordinates of a central spot among the multiple spots present in the patch tissue images.

4. The apparatus for predicting cell type enrichment from tissue images according to claim 3, wherein the image dividing part of the cell type enrichment prediction model is constructed to perform a process of matching the transcriptome data with the tissue image data based on the coordinates of the spots, a process of placing a rectangular box of a preset size in the tissue image data including the multiple spots, and a process of extracting the tissue image data into at least one patch tissue image such that the coordinates of the central spot among the multiple spots become central coordinates of the rectangular box.

5. The apparatus for predicting cell type enrichment from tissue images according to claim 3, wherein the molecule marker model part of the cell type enrichment prediction model is constructed based on training data in which cell distribution information for each type of cell group present in existing tissue images published on the Internet is matched to transcriptome data present in each single-cell type.

6. The apparatus for predicting cell type enrichment from tissue images according to claim 3, wherein the program includes information about the types of cell groups predicted from the tissue images and a heatmap tissue image indicating distribution information of cells in each type of cell group, as the cell type enrichment information.

7. A method for predicting cell type enrichment from tissue images based on spatially resolved gene expression information using an apparatus for predicting cell type enrichment from tissue images, the method comprising:
receiving tissue images of a specimen; and
predicting cell type enrichment information by inputting the tissue images to a cell type enrichment prediction model which is trained using training data that consists of spatially resolved transcriptome information and tissue images spatially aligned with the spatially resolved transcriptome information,
wherein the spatially resolved transcriptome information includes transcriptome data having spatial information and tissue image data sharing the spatial information, and
wherein the spatial information means position information about multiple spots arranged in a two-dimensional plane in the tissue image data and includes coordinates of each of the spots.

8. The method for predicting cell type enrichment from tissue images according to claim 7, wherein the cell type enrichment prediction model is constructed based on training data in which the spatially resolved transcriptome information for each of previously collected human or animal tissues is matched to the cell type enrichment information with respect to the transcriptome data classified according to the coordinates of each of the spots.

9. The method for predicting cell type enrichment from tissue images according to claim 8, wherein the cell type enrichment prediction model includes: an image dividing part dividing the tissue image data into patch tissue images of a preset size; a molecule marker model part outputting the cell distribution information for each type of cell group labeled through the transcriptome data, and a prediction part extracting the cell type enrichment information labeled with the transcriptome data based on the coordinates of a central spot among the multiple spots present in the patch tissue images.

10. The method for predicting cell type enrichment from tissue images according to claim 9, wherein the molecule marker model part is constructed based on training data in which cell distribution information for each type of cell group present in existing tissue images published on the Internet is matched to transcriptome data present in each single-cell type.

11. A non-transitory computer-readable recording medium in which a computer program for executing the method for predicting cell type enrichment from tissue images according to claim 10 is recorded.

12. The method for predicting cell type enrichment from tissue images according to claim 9, wherein, in the step of predicting cell type enrichment information, the cell type enrichment information includes information about the types of cell groups predicted from the tissue images and a heatmap tissue image indicating distribution information of cells in each type of cell group.

13. A non-transitory computer-readable recording medium in which a computer program for executing the method for predicting cell type enrichment from tissue images according to claim 12 is recorded.

14. A non-transitory computer-readable recording medium in which a computer program for executing the method for predicting cell type enrichment from tissue images according to claim 9 is recorded.

15. The method for predicting cell type enrichment from tissue images according to claim 8, wherein the image dividing part of the cell type enrichment prediction model is constructed to perform a process of matching the transcriptome data with the tissue image data based on the coordinates of the spots, a process of placing a rectangular box of a preset size in the tissue image data including the multiple spots, and a process of extracting the tissue image data into at least one patch tissue image such that the coordinates of the central spot among the multiple spots become central coordinates of the rectangular box.

16. A non-transitory computer-readable recording medium in which a computer program for executing the method for predicting cell type enrichment from tissue images according to claim 15 is recorded.

17. A non-transitory computer-readable recording medium in which a computer program for executing the method for predicting cell type enrichment from tissue images according to claim 8 is recorded.

18. A non-transitory computer-readable recording medium in which a computer program for executing the method for predicting cell type enrichment from tissue images according to claim 7 is recorded.

* * * * *